Patented Sept. 26, 1939

2,174,009

UNITED STATES PATENT OFFICE 2,174,009

THERAPEUTIC PREPARATION

Ferdinand W. Nitardy, Brooklyn, N. Y., assignor to E. R. Squibb & Sons, New York, N. Y., a corporation of New York No Drawing. Application November 2, 1937, Serial No. 172,377

7 Claims. (Cl. 167—58)

This invention relates to water-soluble organic sulfides of acidic reaction, particularly salts of aliphatic amino acids containing a sulphydryl group, such as cysteine hydrochloride.

Water-soluble organic sulfides of acidic reaction (notably cysteine hydrochloride) have been used for the production of wet dressings to aid in the healing of wounds; but, for example, a solution of cysteine hydrochloride of a strength sufficient to be therapeutically effective is definitely acidic, having a pH of 1.7 in 0.5% concentration, and is therefore irritating when applied to an open wound. Use of a solution of sodium hydroxide to neutralize or lower the acidity of cysteine hydrochloride solutions has been unavailing; for cysteine hydrochloride is unstable in alkaline solution, sulfur being precipitated and hydrogen sulfide being evolved when it is treated with sodium hydroxide solution and stored for subsequent use.

It is the object of this invention to provide preparations of water-soluble organic sulfides of acidic reaction which are stable and form highly effective and substantially non-irritating aqueous solutions.

In the practice of this invention, a water-soluble organic sulfide of acidic reaction, such as cysteine hydrochloride, is mixed with a buffering agent, inter alia sodium borate (borax), sodium citrate, and sodium phosphate, which will raise the pH to, and maintain it at, between 3 and 5, preferably between 3.5 and 4. The term "buffering agent" is used herein in the accepted sense of a substance for protecting the pH of a solution against change. Sodium borate is the preferred buffering agent because it forms a free-flowing, non-caking mixture with cysteine hydrochloride.

The following example is illustrative of the invention: Crystalline cysteine hydrochloride is finely ground and dehydrated in a vacuum over phosphorus pentoxide for twelve or more hours to remove its water of crystallization. Sodium borate is dried at 105° C. for twelve or more hours. 0.5 g. of the dry cysteine hydrochloride and 0.428–0.437 g. of the dry sodium borate are mixed, ampuled, and sealed in the substantial absence of air, e. g., in a vacuum. The weights of sodium borate which must be mixed with 0.5 g. of cysteine hydrochloride to give 100 cc. aqueous solutions having pH's in the range 3.5 to 4.0 are:

|  | gram |
|---|---|
| pH 3.5 | 0.428 |
| pH 3.8 | 0.433 |
| pH 4.0 | 0.437 |

These mixtures of cysteine hydrochloride and sodium borate do not cake when ampuled, but remain free-flowing and stable. They dissolve in 100 cc. of water to yield clear colorless solutions. Wet dressings prepared from these solutions are substantially non-irritating and highly effective in promoting the healthy granulation and rapid healing of open wounds.

It is to be understood that the foregoing example is merely illustrative and not limitative of the invention, which may be variously otherwise embodied—as with respect to particular water-soluble organic sulfides of acidic reaction, buffering agents, proportions, and procedures—within the scope of the appended claims.

I claim:

1. A therapeutic preparation essentially comprising cysteine hydrochloride and a buffering agent, which will yield an aqueous solution having a pH between 3 and 5.

2. A therapeutic preparation suitable for producing a substantially non-irritating wet dressing, essentially comprising cysteine hydrochloride and sodium borate, which will yield an aqueous solution having a pH between 3 and 5.

3. A therapeutic preparation suitable for producing a substantially non-irritating wet dressing, essentially comprising substantially dehydrated cysteine hydrochloride and substantially dehydrated sodium borate, which will yield an aqueous solution having a pH between 3.5 and 4.

4. A therapeutic preparation suitable for producing a substantially non-irritating wet dressing, essentially comprising cysteine hydrochloride and sodium citrate, which will yield an aqueous solution having a pH between 3 and 5.

5. A therapeutic preparation suitable for producing a substantially non-irritating wet dressing, essentially comprising cysteine hydrochloride and sodium phosphate, which will yield an aqueous solution having a pH between 3 and 5.

6. The method of making a stable preparation suitable for the production of a substantially non-irritating wet dressing, which comprises mixing cysteine hydrochloride and a buffering agent in proportion which will yield an aqueous solution having a pH between 3 and 5.

7. The method of making a stable therapeutic preparation, which comprises substantially dehydrating cysteine hydrochloride and sodium borate, mixing them in proportions which will yield an aqueous solution having a pH between 3 and 5 and ampuling the mixture in the substantial absence of air.

FERDINAND W. NITARDY.